United States Patent [19]
Jackson et al.

[11] Patent Number: 6,002,890
[45] Date of Patent: Dec. 14, 1999

[54] FEEDBACK BETWEEN MARKING AND PAPER PATH SUBSYSTEMS TO REDUCE SHUTDOWNS

[75] Inventors: Warren B. Jackson, San Francisco, Calif.; Sudhendu Rai, Penfield, N.Y.

[73] Assignee: Xerox Corporation, Stamford, Conn.

[21] Appl. No.: 09/161,409

[22] Filed: Sep. 28, 1998

[51] Int. Cl.⁶ .................................................. G03G 15/00
[52] U.S. Cl. ............................ 399/18; 399/160; 399/396
[58] Field of Search ................................ 399/16, 18, 43, 399/46, 76, 160, 301, 388, 394, 396; 395/111

[56] References Cited

U.S. PATENT DOCUMENTS

| | | | |
|---|---|---|---|
| 5,086,319 | 2/1992 | Carolan | 399/396 |
| 5,173,733 | 12/1992 | Green | 399/160 X |
| 5,471,290 | 11/1995 | Nagayama et al. | 399/18 X |
| 5,502,544 | 3/1996 | Carolan | 399/46 |
| 5,543,894 | 8/1996 | Carolan | 399/78 |

FOREIGN PATENT DOCUMENTS 57-058165  4/1982  Japan .

*Primary Examiner*—Matthew S. Smith
*Assistant Examiner*—Sophia S. Chen
*Attorney, Agent, or Firm*—Ronald F. Chapuran

[57] ABSTRACT

A method of control to synchronize the arrival of images and copy sheets at a transfer station by sensing delay of a copy sheet arrival at the transfer station. There is then a determination that the delay of arrival is incapable of being corrected to synchronize with a given image. In response, the control decides to rewrite the given image on the receiving medium or further delay the arrival of the copy sheet, or a combination of rewrite and delay, in order that the arrival of a given image and copy sheet is synchronized.

13 Claims, 5 Drawing Sheets

FEEDBACK BETWEEN MARKING AND PAPER PATH SUBSYSTEMS TO REDUCE SHUTDOWNS

BACKGROUND OF THE INVENTION

The invention relates to image transfer, and more particularly, to the synchronization of transfers of images to copy sheets to reduce shutdowns.

For reliable and rapid movement of copy sheets through a reproduction machine, it is important to synchronize various drives and transports. This is important, in particular, in multi-drive machines such as in color machines wherein efficient registration and movement of sheets is essential to quality output. In addition, in an age demanding a variety of machine features and various machines to provide the features, the use of too many custom designed controls or other drives to provide the features creates an additional obstacle to consistent and reliable performance. For example, in a printing or reproduction machine, there are a variety of control profiles required for various applications such as driving the photoreceptor, driving a recirculating document handler or automatic document feeder, or driving copy sheets at various stages such as from the copy sheet source, to a registration gate, during a transfer operation, entering and exiting a fusing stations, and delivering copy sheets to many finishing stages such as to output trays, sorters, stackers, compilers, and staplers.

It is a generally known technique to provide controlled movement within positioning systems, in particular moving and registering paper within a xerographic reproduction or printing system. For example, U.S. Pat. No. 5,502,544, assigned to the same assignee as the present invention, discloses an imaging machine having a control and movable components including a photosensitive member and copy sheet transports. The control includes a servo system connected to given movable components and provided with control profiles for directing the movement of the component, including acceleration, deceleration, and constant velocity portions. A main controller monitors the operation and predetermined conditions and automatically changes selected portions of the control profile in response to predetermined conditions. In addition, U.S. Pat. No. 5,543,894, also assigned to the same assignee as the present invention, discloses a system for monitoring discrete drives at the time of transitions from one transport to another transport to detect mismatch and surface velocity. Upon detection of mismatch of velocity, a given controller is adjusted through a command bus to correct for the mismatch.

In the prior art, images from an image source are put into a marking subsystem at a constant speed. The paper handling subsystem delivers paper to the marking subsystem at a precisely specified time window in order to receive the image. The precise time of arrival is necessary because the arrival time determines the position that the image ends up on the paper. If the paper is delayed, the machine may be shut down because the image position would be outside the required position specifications. Further, as shown in U.S. Pat. No. 5,086,319 also assigned to the same assignee of the present invention, there is shown a system for automatically adjusting the velocity of a copy sheet to correct for previously determined misregistration of a document at an exposure station.

It would be desirable, however, if the paper handling system experienced a delay in transferring the paper to the marking subsystem, that the machine would be able to alter the marking system in order to match the time delay of the paper path. It would be desirable, therefore, to provide a control that uses bidirectional information feedback between marking and paper subsystems to accommodate paper path problems and registration problems. It is also desirable to provide a control wherein either the copy sheet can be selectively delayed or the marking system selectively rewrite an image, or both for suitable sheet registration.

It is an object, therefore, of the present invention to provide a new and improved control system wherein the marking system can be automatically altered. Another object of the present invention is to be able to change the control wherein either the copy sheet can be selectively delayed or the marking system selectively rewrite an image, or both for suitable sheet registration.

Other advantages of the present invention will become apparent as the following description proceeds, and the features characterizing the invention will be pointed out with particularity in the claims annexed to and forming a part of this specification.

SUMMARY OF THE INVENTION

Briefly, the present invention is an electronic image processing apparatus with a control for forming an image in synchronization with the conveyance of copy sheets. The control synchronizes the arrival of images and copy sheets at a transfer station by sensing delay of a copy sheet arrival at the transfer station. There is then a determination that the delay of arrival is incapable of being corrected to synchronize with a given image. In response, the control decides to rewrite the given image on the receiving medium or further delay the arrival of the copy sheet, or a combination of rewrite and delay, in order that the arrival of a given image and copy sheet is synchronized.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
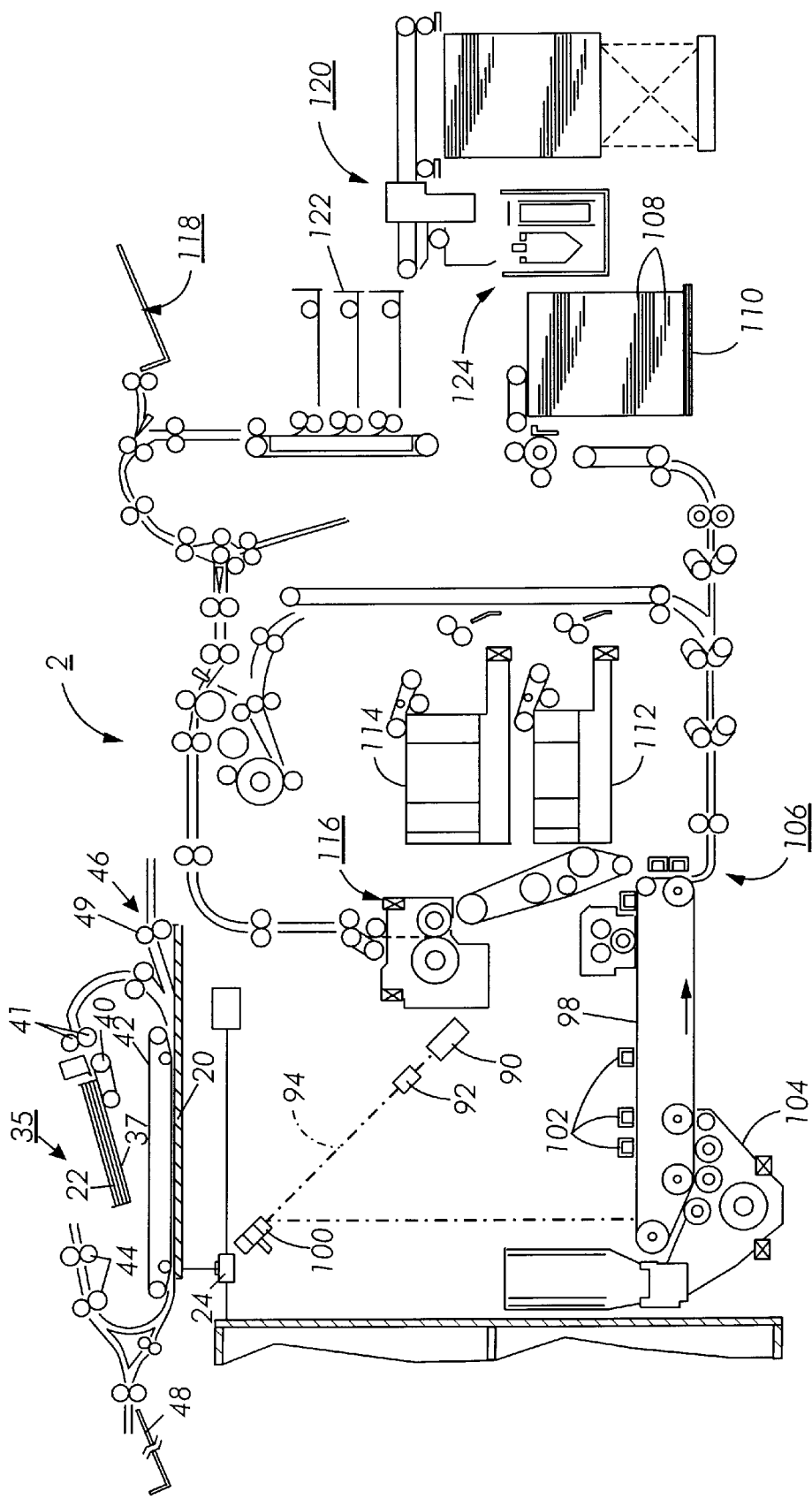
FIG. 1 is a plan view illustrating a typical imaging system incorporating the present invention.

Referring to FIG. 1, there is shown an exemplary laser based printing system for processing print jobs in accordance with the teachings of the present invention. The printing system typically is divided into a scanner section, controller section, and printer section. While a specific printing system is shown and described, the present invention may be used with other types of printing systems such as ink jet, ionographic, etc.

The scanner section incorporates a transparent platen 20 on which the document 22 to be scanned is located. One or more linear arrays 24 are supported for reciprocating scanning movement below platen 20. A lens and mirrors cooperate to focus array 24 on a line -like segment of platen 20 and the document being scanned thereon. Array 24 provides image signals or pixels representative of the image scanned which after suitable processing are output to the controller section.

Analog image signals output by array 24 are converted to digital signals to provide necessary enhancements and changes to the image signals such as filtering, thresholding, screening, cropping, etc. Documents 22 to be scanned may be located on platen 20 for scanning by automatic document handler (ADH) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20. It should be understood that there may be no document handling capability and that the imaging system could be interconnected to a network and receive job or printing requirements solely in digital form from the network for storage in suitable memory before printing.

The printer section comprises a laser type printer and for purposes of explanation is separated into a Raster Output Scanner (ROS) section, Print Module Section, Paper Supply section, and Finisher. The ROS has a laser 90, the beam of which is split into two imaging beams 94. Each beam 94 is modulated in accordance with the content of an image signal input by acousto-optic modulator 92 to provide the dual imaging beams 94. Beams 94 are scanned across a moving photoreceptor 98 of a Print Module by the mirrored facets of a rotating polygon 100 to expose two image lines on photoreceptor 98 with each scan and create the latent electrostatic images represented by the image signal input to modulator 92.

Photoreceptor 98 is uniformly charged by corotrons 102 at a charging station preparatory to exposure by imaging beams 94. The latent electrostatic images are developed by developer 104 and transferred at transfer station 106 to a print media 108. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Figure 2:
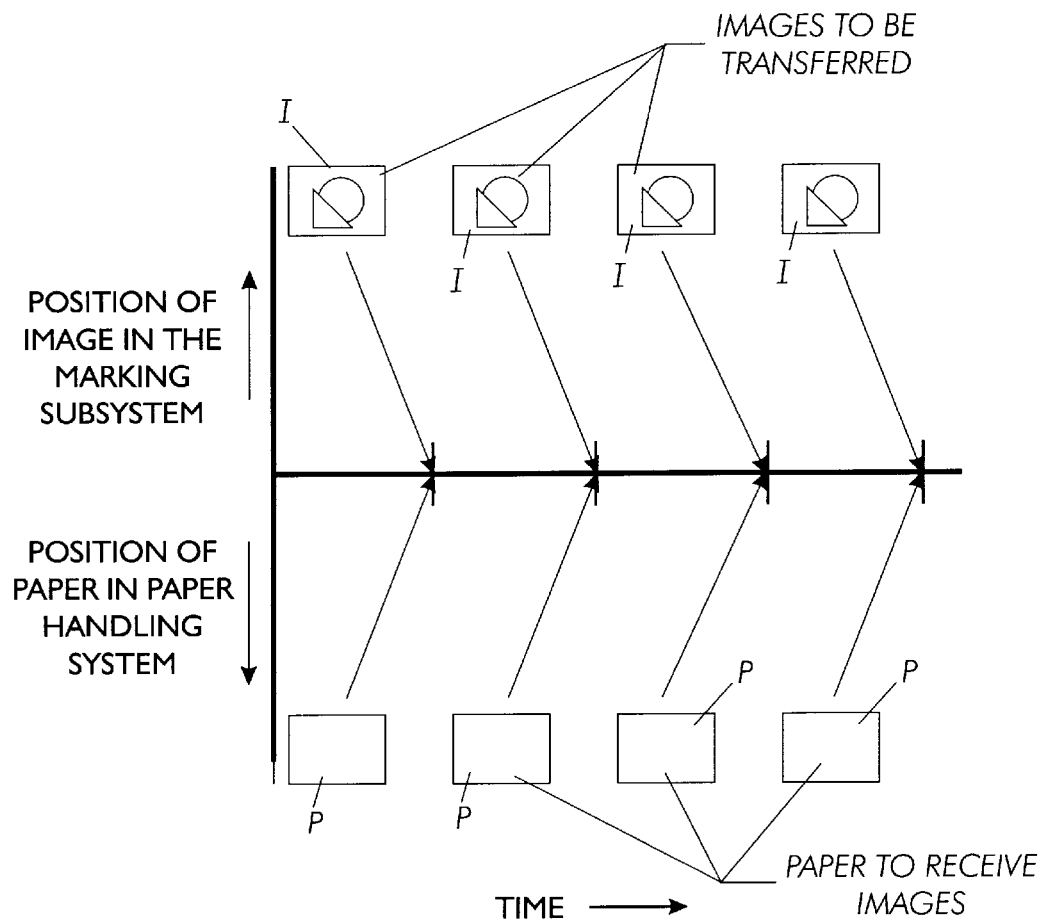
FIG. 2 is a schematic illustration of a prior art space-time plot of an image transfer process.

With reference to FIG. 2, there is shown a typical prior image to paper transfer system. In particular, the images I from the image source are put into a marking subsystem at a constant speed because the marking subsystem is operated at a constant speed. A paper handling subsystem delivers paper P to the marking subsystem at a precisely specified time window in order to receive the image. The precise time of arrival is necessary because the arrival time determines the position that the image is put on the paper. If the paper is delayed even slightly, the machine must be shut down because the image position would be outside the required position specifications. Ideally if the paper handling system experienced a delay in transferring the paper to the marking subsystem, the machine would slow down the marking system in order to match the time delay of the paper path. However, it is considered highly undesirable and difficult in the prior art to vary the speed of the marking subsystem to accommodate the paper delay.

Figure 3:
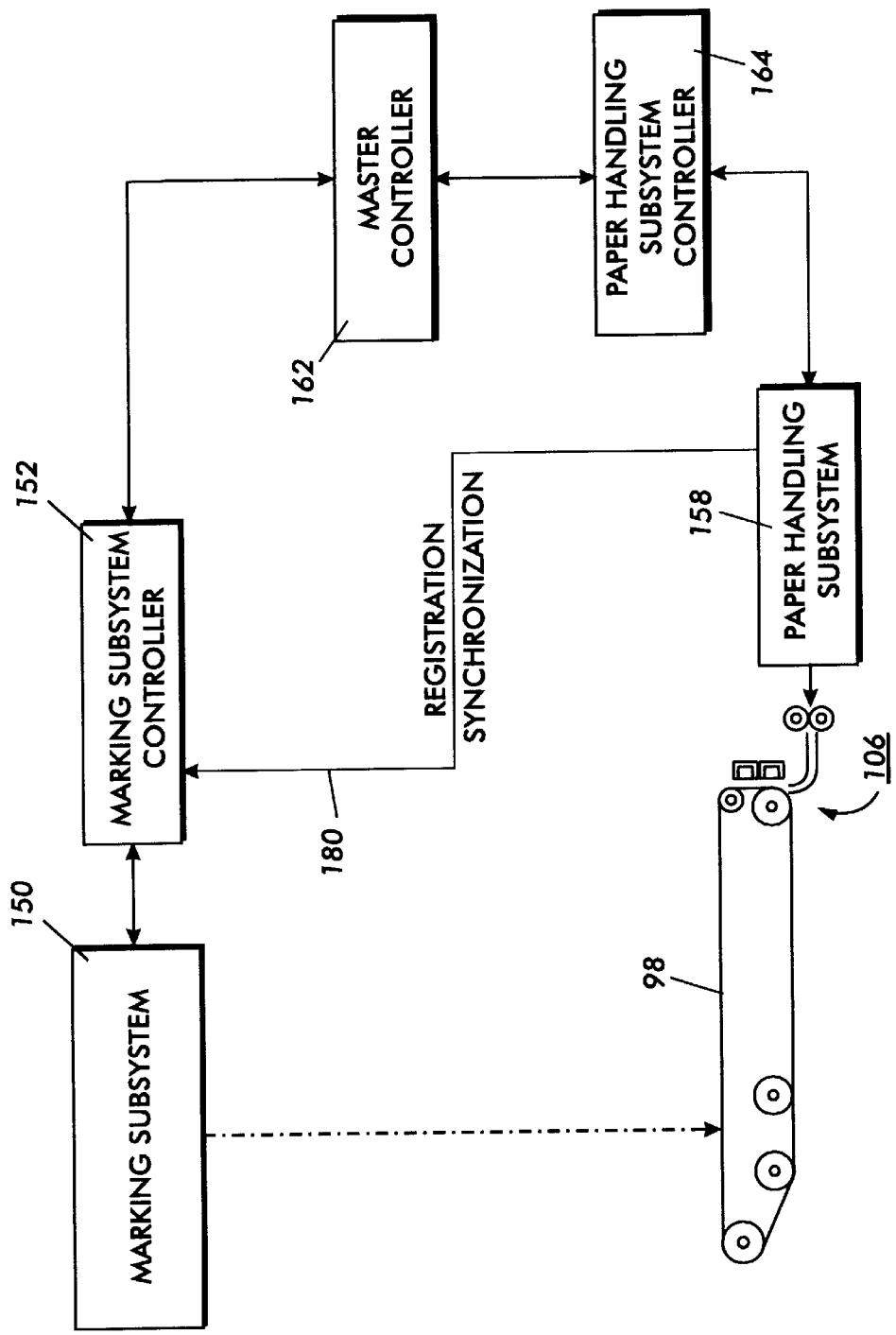
FIG. 3 is a control in block form illustrating the present invention.

With reference to FIG. 3, in accordance with the present invention, a marking subsystem 150 communicates with a marking subsystem controller 152 and a paper handling subsystem 158 communicates with a paper handling subsystem controller 164. A master controller 162, in turn communicates with the subsystem controllers 152 and 164 and there can be additional registration synchronization between controllers 152 and 158 provided by line 180. If the paper subsystem 158,164, for example, a smart distributed paper handling system as disclosed in pending application Ser. No. 033,152 filed 3/2/98 incorporated herein detects that the paper will not arrive at the marking subsystem 150,152 within the specified time interval, the paper subsystem in accordance with the present invention can notify the marking subsystem. The marking subsystem can then re-write or delay the writing of images into the image transfer section. The smart distributed paper handling subsystem has an estimate of the possible delay in the arrival time of the sheet at the transfer zone. If the marking subsystem electronics can handle images at in-between locations then the image is written there based upon the delay in the paper's arrival time. If the images can be written only at fixed locations by the marking system, then the process of marking is delayed further by one image slot, and that information is communicated to the paper handling system so that the media is further slowed down to match the arrival time of the next image.

Figure 4:
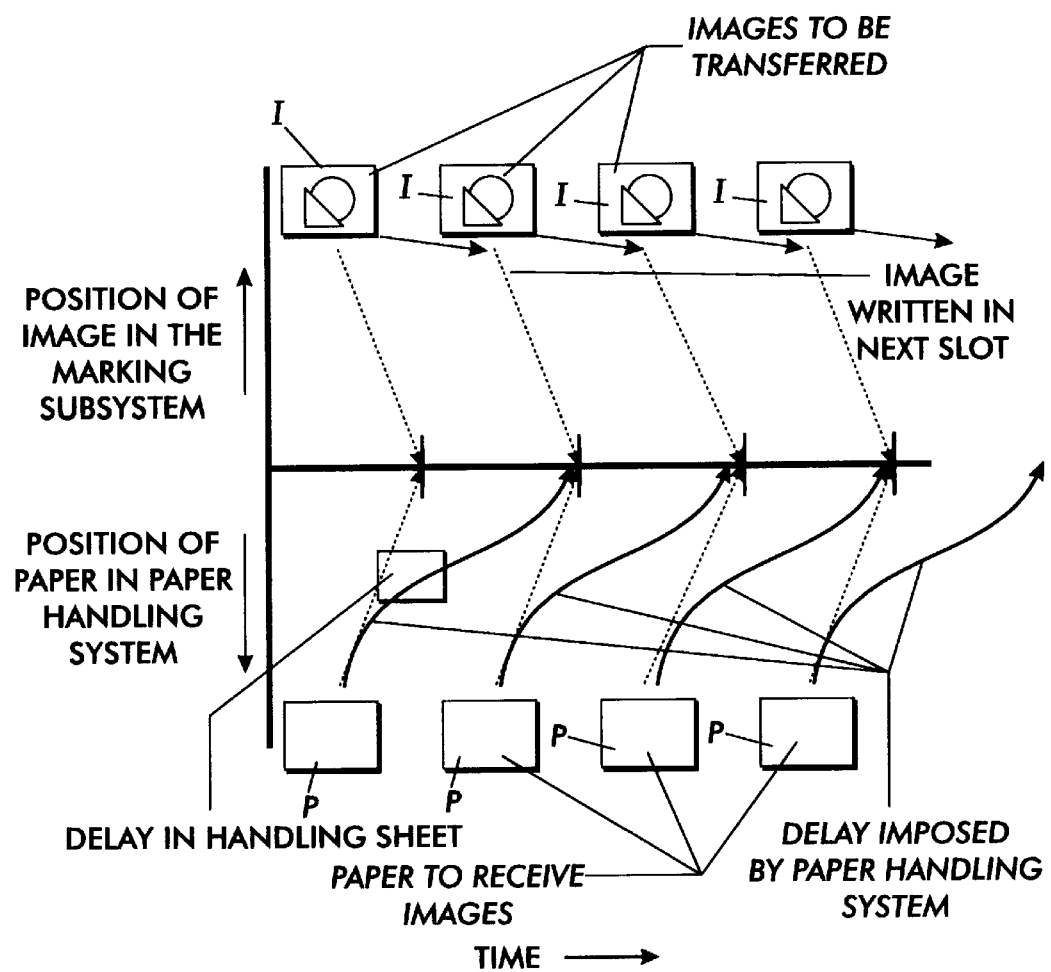
FIG. 4 is a schematic illustration of a space-time plot of an image transfer process in accordance with the present invention.

FIG. 4 indicates that the images in the marking system are delayed by one entire image. In this manner, paper handling delays that normally would have caused the machine to shut down are accommodated by feedback between the marking and paper handling subsystems. An additional feature of the proposed invention is that the image position on the paper in the process direction can be controlled by adjusting the paper handling delay with respect to the image arrival time.

Figure 5:
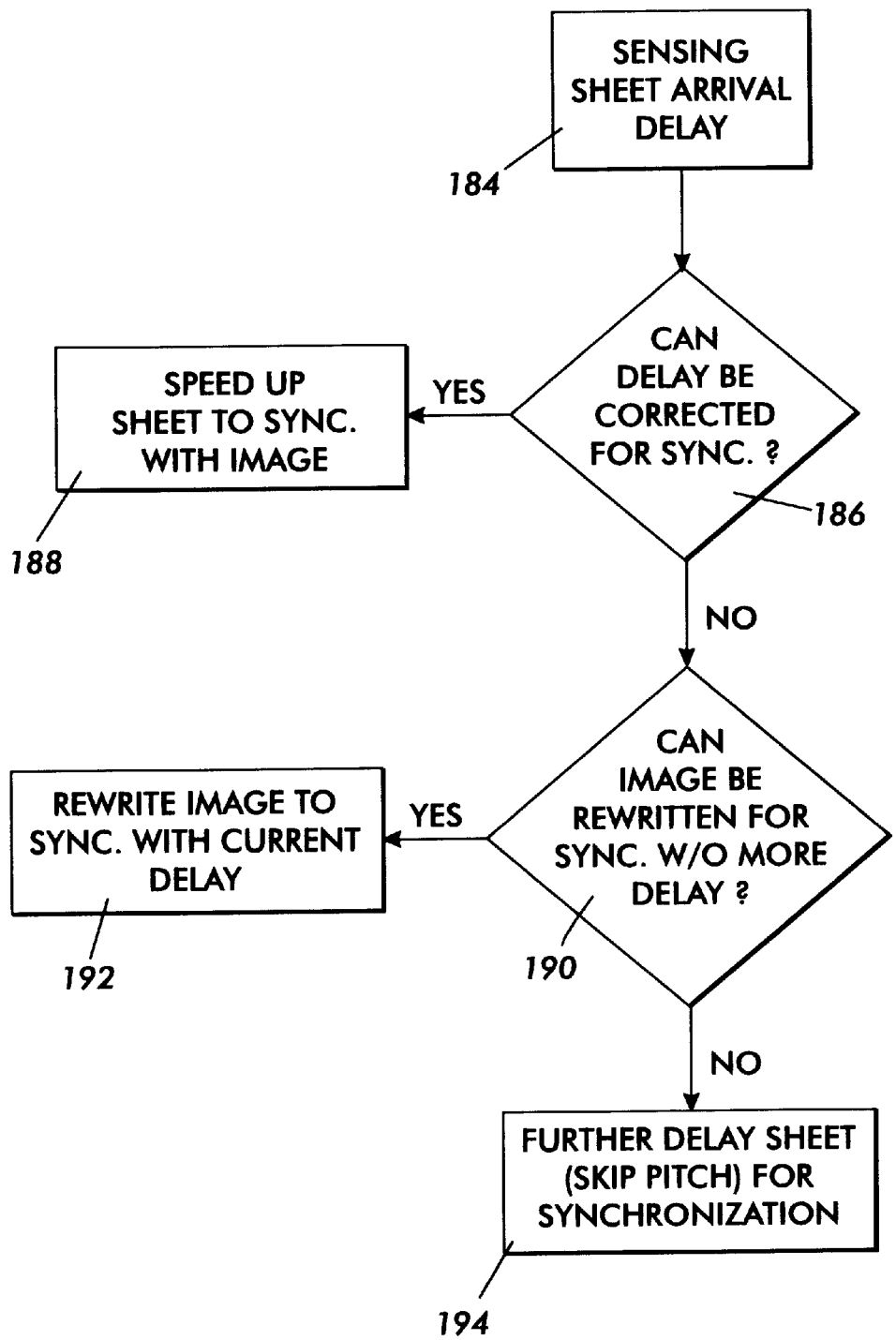
FIG. 5 is a flow chart illustrating image- copy sheet synchronization in accordance with the present invention.

With reference to FIG. 5, the flow chart further illustrates the instant invention. As shown at block 184, there is a sensing or determination of a sheet arrival delay, for example, at a registration station. The first determination as shown in the decision block 186 is whether or not the delay can be corrected. By this is meant the immediate speed up of the copy sheet for correct synchronization without any further control decisions. If so, as shown in block 188, the copy sheet is accelerated to be in synch with an arriving image. It should be understood that the example of registration of image and copy sheets at a registration station is only one example where the principles of the present invention may be applicable. It should be understood that the present invention applies to any combination of a change in the imaging or marking timing or a change in the velocity or movement of sheets or documents within the system in order to properly coordinate the projections or images on a marking medium and the movement of copy sheets within the system for transfer of the image on to the sheets.

If the delay cannot be corrected such that a suitable change in speed shown at block 188 will insure registration, a second decision is made at decision block 190. In particular, can the image be rewritten for synchronization without further delay of the copy sheet. In other words, is it possible to erase the given image on the marking medium that is in advance of the copy sheet, and rewrite the same image with a slight delay in order to be synchronized with the copy sheet. If so, as shown at block 192, the image is rewritten to accommodate the current delay of the copy sheet. However, if it is not possible to rewrite the image in synchronization with the current delay, as shown in block 194, a further delay of the copy sheet is required. This could be an additional slight delay to accommodate the rewritten image, but more generally would be a delay sufficient to equal a timing pitch of the system. In other words, the delay would amount to a skipped pitch or skipped image on the marking medium, such that the throughput of the machine would be set back one pitch cycle.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In an electronic image processing apparatus having a control, an image receiving medium, a source of copy sheets, and a transfer station for transferring images from the image receiving medium to the copy sheets, a method of control to synchronize the arrival of images and copy sheets at the transfer station comprising the steps of:

sensing a delay of a copy sheet arrival at the transfer station, determining that the delay of arrival is incapable of being corrected to synchronize with a given image, responding to the determination to rewrite the given image on the receiving medium and delay the arrival of the copy sheet whereby the arrival of the given image and the copy sheet is synchronized.

2. The method of claim 1 wherein the delay time is a given machine pitch.

3. The method of claim 1 wherein the delay time is based upon a determination that remarking the given image will synchronize the given image with the copy sheet.

4. In an electronic image processing apparatus having a copy sheet handling subsystem with a first control, an image marking subsystem including a second control and an image receiving medium, a source of copy sheets, and a transfer station for transferring images from the image receiving medium to the copy sheets, a method to synchronize the arrival of images and copy sheets at the transfer station comprising the steps of:

sensing an estimated delay of a copy sheet arrival at the transfer station by the first control, the first control notifying the second control of the estimated delay, the second control responding to the estimated delay to change the operation of the image marking subsystem in order to synchronize the arrival of an image and copy sheet at the transfer station including the step of remarking an image on the image receiving medium and delaying arrival of the copy sheet.

5. The method of claim 4 wherein the step of delaying the arrival of the sheet at the transfer station includes the step of determining at the images can only be marked at machine timing pitches.

6. The method of claim 4 wherein the step of delaying the arrival of the sheet at the transfer station includes the step of determining that the images can only be marked at machine timing pitches and further delaying marking and delaying sheet arrival.

7. The method of claim 4 wherein the step of delaying the arrival of the sheet at the transfer station includes the step of determining that images can be marked at arbitrary locations on the image receiving medium.

8. The method of claim 4 wherein the step of changing the operation of the image marking subsystem in order to synchronize the arrival of an image and copy sheet at the transfer station includes the step of altering the arrival time of the sheet at the transfer station.

9. The method of claim 8 wherein the step of altering the arrival of the sheet at the transfer station includes the step of delaying the arrival time of the sheet at the transfer station.

10. The method of claim 9 wherein the step of delaying the sheet at the transfer station includes the step of determining that the images can only be marked at machine timing pitches and further delaying marking and delaying sheet arrival.

11. The method of claim 8 wherein the step of altering the arrival of the sheet at the transfer station includes the step of determining if the images can only be marked at machine timing pitches.

12. The method of claim 11 wherein the step of altering the arrival of the sheet at the transfer station includes the step of determining that images can be marked at arbitrary locations on the image receiving medium.

13. In an electronic image processing apparatus having a control, an image receiving medium, a source of copy sheets, and a transfer station for transferring images from the image receiving medium to the copy sheets, a method of control to synchronize the arrival of images and copy sheets at the transfer station comprising the steps of:

sensing a deviation of a copy sheet arrival at the transfer station, determining that the deviation of arrival is incapable of being corrected by a change in acceleration of the copy sheet to synchronize with a given image, and responding to the determination to change the operation of the marking subsystem whereby the arrival of the given image and the copy sheet is synchronized including the step of remarking an image on the image receiving medium.

\* \* \* \* \*